United States Patent
Synnergren et al.

(10) Patent No.: US 9,635,594 B2
(45) Date of Patent: Apr. 25, 2017

(54) METHOD; APPARATUS AND COMPUTER PROGRAM PRODUCT FOR MOVING A UE CONTEXT APPLICATION SERVICE HANDOVER BETWEEN ACCESS NODES

(71) Applicant: Telefonaktiebolaget L M Ericsson (publ), Stockholm (SE)

(72) Inventors: Per Synnergren, Gammelstad (SE); Mathias Sintorn, Sollentuna (SE); Jari Vikberg, Järna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/413,143

(22) PCT Filed: Oct. 15, 2012

(86) PCT No.: PCT/EP2012/070395
§ 371 (c)(1),
(2) Date: Jan. 6, 2015

(87) PCT Pub. No.: WO2014/008955
PCT Pub. Date: Jan. 16, 2014

(65) Prior Publication Data
US 2015/0208305 A1 Jul. 23, 2015

Related U.S. Application Data

(60) Provisional application No. 61/669,750, filed on Jul. 10, 2012.

(51) Int. Cl.
*H04W 36/00* (2009.01)
*H04W 36/12* (2009.01)
(Continued)

(52) U.S. Cl.
CPC ......... *H04W 36/12* (2013.01); *H04L 12/4633* (2013.01); *H04L 67/10* (2013.01);
(Continued)

(58) Field of Classification Search
None
See application file for complete search history.

(56) References Cited

U.S. PATENT DOCUMENTS 8,125,939 B2 2/2012 Murasawa et al.
8,514,756 B1 8/2013 Ramachandra et al.
(Continued)

FOREIGN PATENT DOCUMENTS

EP 1701516 A1 9/2006
EP 1708423 A1 10/2006
(Continued)

OTHER PUBLICATIONS

3GPP, "3rd Generation Partnership Project; Technical Specification Group GSM/EDGE Radio Access Network; General Packet Radio Service (GPRS); Base Station System (BSS)—Serving GPRS Support Node (SGSN); BSS GPRS Protocol (BSSGP) (Release 11)", 3GPP TS 48.018 V11.0.0, Sep. 2012, 1-185.
(Continued)

*Primary Examiner* — Adolf Dsouza
(74) *Attorney, Agent, or Firm* — Murphy, Bilak & Homiller, PLLC

(57) ABSTRACT

A telecommunications network is accessible to a user equipment via at least a first access node or a second access node. For supporting one or more application services which are accessible to the user equipment via the first access node or via the second access node, a first application service platform is provided at the first access node, and a second application service platform is provided at the second access node. Via the first application service platform at the first
(Continued)

access node an application service is provided to the user equipment which is connected to the first access node. At handover of the user equipment from the first access node to the second access node, a context of the user equipment is moved from the application service platform at the first access node to the second application service platform at the second access node.

8 Claims, 13 Drawing Sheets

(51) Int. Cl.
*H04W 4/20* (2009.01)
*H04W 88/08* (2009.01)
*H04W 4/00* (2009.01)
*H04M 1/725* (2006.01)
*H04L 12/46* (2006.01)
*H04L 29/08* (2006.01)
*H04W 36/18* (2009.01)
*H04W 88/16* (2009.01)

(52) U.S. Cl.
CPC ....... *H04M 1/72522* (2013.01); *H04W 4/003* (2013.01); *H04W 4/20* (2013.01); *H04W 36/0033* (2013.01); *H04W 36/0044* (2013.01); *H04W 36/18* (2013.01); *H04W 88/08* (2013.01); *H04W 88/16* (2013.01)

(56) References Cited

U.S. PATENT DOCUMENTS

| | | | |
|---|---|---|---|
| 8,848,610 | B2 | 9/2014 | Miklos et al. |
| 9,198,032 | B2 | 11/2015 | Serravalle |
| 2003/0204599 | A1 | 10/2003 | Trossen et al. |
| 2003/0212764 | A1* | 11/2003 | Trossen ............ H04W 36/0011 709/219 |
| 2006/0056351 | A1 | 3/2006 | Wall |
| 2008/0225798 | A1 | 9/2008 | Trossen |
| 2010/0020709 | A1 | 1/2010 | Ohm et al. |
| 2010/0061301 | A1 | 3/2010 | Antal et al. |
| 2010/0208653 | A1 | 8/2010 | Morinaga et al. |
| 2013/0090087 | A1 | 4/2013 | Kroeselberg et al. |
| 2013/0260810 | A1 | 10/2013 | Rayavarapu |
| 2013/0287012 | A1 | 10/2013 | Pragada et al. |

FOREIGN PATENT DOCUMENTS

| | | |
|---|---|---|
| EP | 2007098 A1 | 12/2008 |
| EP | 2403186 A1 | 1/2012 |
| WO | 0106732 A1 | 1/2001 |
| WO | 2011116821 A1 | 9/2011 |

OTHER PUBLICATIONS

3GPP, "3rd Generation Partnership Project; Technical Specification Group Radio Access Network; Evolved Universal Terrestrial Radio Access Network (E-UTRAN); S1 Application Protocol (S1AP) (Release 11)", 3GPP TS 36.413 V11.1.0, Sep. 2012, 1-262.

3GPP, "3rd Generation Partnership Project; Technical Specification Group Radio Access Network; UTRAN Iu interface Radio Access Network Application Part (RANAP) signalling (Release 11)", 3GPP TS 25.413 V11.1.0, Sep. 2012, 1-430.

3GPP, "3rd Generation Partnership Project; Technical Specification Group Services and System Aspects; IP Multimedia Subsystem (IMS) Service Continuity; Stage 2 (Release 12)", 3GPP TS 23.237 V12.0.0, Jun. 2012, 1-167.

3GPP, "3rd Generation Partnership Project; Technical Specification Group Services and System Aspects; IP Multimedia Subsystem (IMS); Stage 2 (Release 11)", 3GPP TS 23.228 V11.5.0, Jun. 2012, 1-288.

Hall, GöRAN, "Method; Apparatus and Computer Program Product for Providing Application Service Platform with Access to Core Network Information Comprising Context Data", U.S. Appl. No. 14/413,129, filed Jan. 6, 2015.

Sintorn, Mathias et al., "Application Service Platform with Access to Context Data of Remote Access Note", U.S. Appl. No. 14/413,059, filed Jan. 6, 2015.

* cited by examiner

METHOD; APPARATUS AND COMPUTER PROGRAM PRODUCT FOR MOVING A UE CONTEXT APPLICATION SERVICE HANDOVER BETWEEN ACCESS NODES

TECHNICAL FIELD

The present invention relates to methods for providing an application service in a telecommunications network and to corresponding devices.

BACKGROUND

In telecommunications networks, e.g., as specified by 3GPP ($3^{rd}$ Generation Partnership Project), it is known to provide application services to users of the telecommunications network. Examples of such applications services are Internet Protocol (IP) based multimedia services. One possibility is to provide the application services by application servers in a core network of the telecommunications network. A further possibility is to add an application service (AS) platform at nodes of an access network of the telecommunications network. Examples of such access nodes are nodes of a Radio Access Network (RAN) of a cellular mobile telecommunications system, such as a Radio Network Controller (RNC) of the UMTS (Universal Mobile Telecommunications System) Terrestrial Radio Access Network (UTRAN) or a base station of the evolved UTRAN (E-UTRAN) according to 3GPP LTE (Long Term Evolution), referred to as E-UTRAN Node B (eNB). Such AS platform may be implemented as an open computing platform which can hosts applications provided by the operator of the telecommunications network and also applications provided by other parties.

In a typical scenario, a user equipment (UE) connected to the telecommunications network via a given access node would access an application running on the AS platform at this access node. The AS platform could then expose useful information available at the access node to the application, e.g., information on radio channel characteristics, UE identifiers, or the like.

However, due to mobility of the UE it may also occur that the access node which is used by the UE for connecting to the telecommunications network changes. This may result in a scenario in which the application is running on the AS platform at one access node, but the UE uses another access node for connecting to the telecommunications network. This may adversely affect usability of the application service, e.g., to a lack of information from the access node.

Accordingly, there is a need for techniques which allow for efficiently addressing such scenarios and providing an AS platform at an access node with valuable information even the access node via which the UE connects to the telecommunications network changes.

SUMMARY

According to an embodiment of the invention, a method of providing an application service in a telecommunications network is provided. The telecommunications network is accessible to a UE via at least a first access node or a second access node. According to the method an AS platform is provided at the first access node. Further, an AS platform is provided at the second access node. The AS platform at the first access node is for supporting one or more application services which are accessible to the UE via the first access node. The AS platform at the second access node is for supporting one or more application services which are accessible to the UE via the second access node. Via the AS platform at the first access node an application service is provided to the UE which is connected to the first access node. At handover of the UE from the first access node to the second access node, a context of the UE is moved from the AS platform at the first access node to the AS platform at the second access node.

According to a further embodiment of the invention, a network node is provided. The network node comprises an access node for providing access of a UE to a telecommunications network. Further, the network node comprises an AS platform for supporting one or more application services which are accessible to the UE via the access node. The network node is configured to provide, via the AS platform, an application service to the UE connected to the access node and, at handover of the UE from the access node to a further access node, move a context of the UE from the AS platform at the access node to an AS platform at the further access node.

According to a further embodiment of the invention, a network node is provided. The network node comprises an access node for providing access of a UE to a telecommunications network. Further, the network node comprises an AS platform for supporting one or more application services which are accessible to the UE via the access node. The network node is configured to provide, via the AS platform, an application service to the UE connected to the access node and, at handover of the UE from a further access node to the access node, move a context of the UE from an AS platform at the further access node to the AS platform at the access node.

According to a further embodiment of the invention, a computer program product is provided. The computer program product comprises program code to be executed by a processor of a network node, thereby configuring the network node to operate in accordance with the above method.

DETAILED DESCRIPTION OF EMBODIMENTS

In the following, the invention will be explained in more detail by referring to exemplary embodiments and to the accompanying drawings. The illustrated embodiments relate to concepts of providing an application service in a telecommunications network. In the illustrated embodiments, the telecommunications network implements a 3GPP cellular radio access technology. However, it is to be understood that these concepts could also be implemented in other types of telecommunications network and using other cellular or non-cellular access technology.

Figure 1:
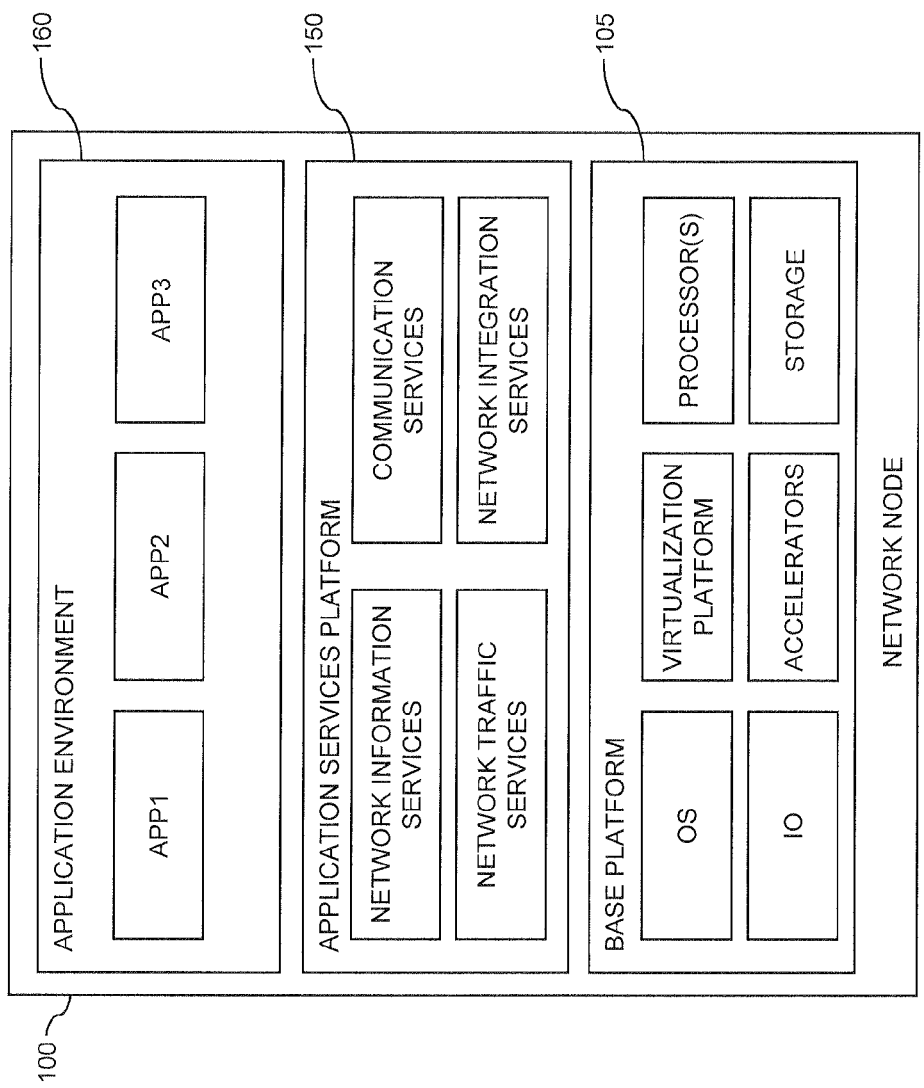
FIG. 1 schematically illustrates a network node according to an embodiment of the invention.

FIG. 1 schematically illustrates a network node 100 according to an embodiment of the invention. As further explained below, the network node 100 may be a node of a RAN of the telecommunications network. In particular, the node may implement an access node in the form of a base station, e.g., an eNB, or a controller of a base station, e.g., an RNC. In the illustrated example, the network node 100 is provided with a base platform 105. The base platform 105 comprises hardware and software structures as required for implementing typical functionalities of the access node. As illustrated in FIG. 1, such hardware structures may include one or more processors, e.g., in the form of a Central Processing Unit and/or a set of special purpose processors. Further, such hardware structures may include a storage, e.g., in the form of a read-only memory (ROM), e.g., a flash ROM, a random-access memory (RAM), e.g., a Dynamic RAM (DRAM) or static RAM (SRAM), a mass storage, e.g., a hard disk or solid state disk, or the like. The storage may store program code to be executed by the processor(s), e.g., for implementing the software structures, and/or other data. Still further, such hardware structures may include one or more accelerators, e.g., for supporting certain computation tasks such as coding or decoding, and Input/Output (10) device(s), e.g., interfaces, receivers, or transmitters. The software structures may include an operating system (OS). Further, the base platform 105 may include a virtualization platform which may be implemented by software structures, but may also be supported by hardware structures.

In addition, the network node 100 includes an AS platform 150 for providing one or more application services to one or more UEs connected to the telecommunications network. The AS platform 150 may be implemented by software structures utilizing hardware and/or software structures of the base platform 105. The AS platform 150 in turn may support an application environment 160 for hosting one or more applications (in the illustrated example shown as APP1, APP2, APP3). Each application may be designed for providing a corresponding application service to the UEs. The applications may be provided by the operator of the telecommunications network and/or by some other party.

The AS platform 150 may also connect to other network nodes or external nodes, e.g., for network management and control.

As can be seen, the AS platform 150 is integrated in the network node 100 to provide application services at the network node 100. In this way, network and/or processing load for providing the application services may be efficiently distributed in the telecommunications network.

The AS platform 150 may be regarded as a middleware between the base platform 105 and the applications running in the application environment. The AS platform 150 may provide functionalities such as basic communication methods and control mechanisms, e.g., allowing the application services to communicate with each other, with other external applications, and/or with other functionalities implemented by the hardware and/or software structures of the network node 100. In the example of FIG. 1, the functionalities provided by the AS platform 150 are referred to as network information services (NIS), network traffic services, network integration services, and communication services. The network traffic services functionality may for example provide routing and priority of UE traffic streams between the access node and one or more applications running on the AS platform 150, or between the access node and Internet. The network integration services may provide interfaces to existing CN functionality relating to, e.g., policy control, charging and lawful/legal interception. Network traffic services and network integration services may be provided for example by functionalities which are similar to those as typically implemented by a user plane gateway. The communication services may provide functionalities used for communications between applications running on the AS platform 150 and other of the functionalities of the AS platform 150.

The functionality referred to as NIS has the purpose of exposing information about the network node 100 and its connected UEs to the applications running in the application environment 160. The information about the network node 100 may for example include a number of connected UEs, e.g., as identified by a Radio Resource Control (RRC) functionality of the network node 100, an average of transmit powers controlled by the network node 100, an average throughput of a cell controlled by the network node 100, an average delay of packets buffered by the network node 100, an average High Speed (HS) code utilization, e.g., average utilization of High Speed Packet Access (HSPA) channelization codes, or the like. Such information about a UE may include an identifier of the UE, e.g., an International Mobile Subscriber Identity (IMSI) associated with the UE, a Mobile Station International Subscriber Directory Number (MSISDN) associated with the UE, a Temporary Mobile Subscriber Identity (TMSI) associated with the UE, a Global Unique Temporary Identity (GUTI) of the UE, an International Mobile Equipment Identity (IMEI) of the UE, or a Radio Network Temporary Identity (RNTI) assigned to the UE. Further, such information about a UE may include radio channel information such as a RRC State indication for the UE, a serving cell Reference Signal Received Power (RSRP) or signal to noise and/or interference measure like Ec/No (Chip energy to Noise spectral density) ratio measured by the UE, a Channel Quality Indicator (CQI) determined by the UE, a transmit power of the UE, or the like. The information may be divided into RAN information as typically available at an access node, e.g., an eNB or an RNC, and core network (CN) information as typically available at CN nodes of the telecommunications network, e.g., at a gateway node. The RAN information may include the GUTI, TMSI, RNTI, RRC state indication, serving cell RSRP or Ec/No ratio, transmit powers, average transmit powers, CQI, cell throughput, or the like. The CN information may include the IMSI, IMEI, MSISDN, UE IP address, or the like.

The NIS functionality may aggregate such information and make the information available to the applications running in the application environment, e.g., through an Application Programming Interface to facilitate usage of the information by applications from various parties. Such API could also be provided by a specific API aggregation application running in the application environment.

One example of the above applications that may be realized on the basis of the AS platform 150 and utilizes the information provided by the network information services functionality is a Transport Control Protocol (TCP) proxy that changes the TCP congestion window as a function of the radio network information it gets via the NIS functionality (or via an API aggregation application).

Figure 2:
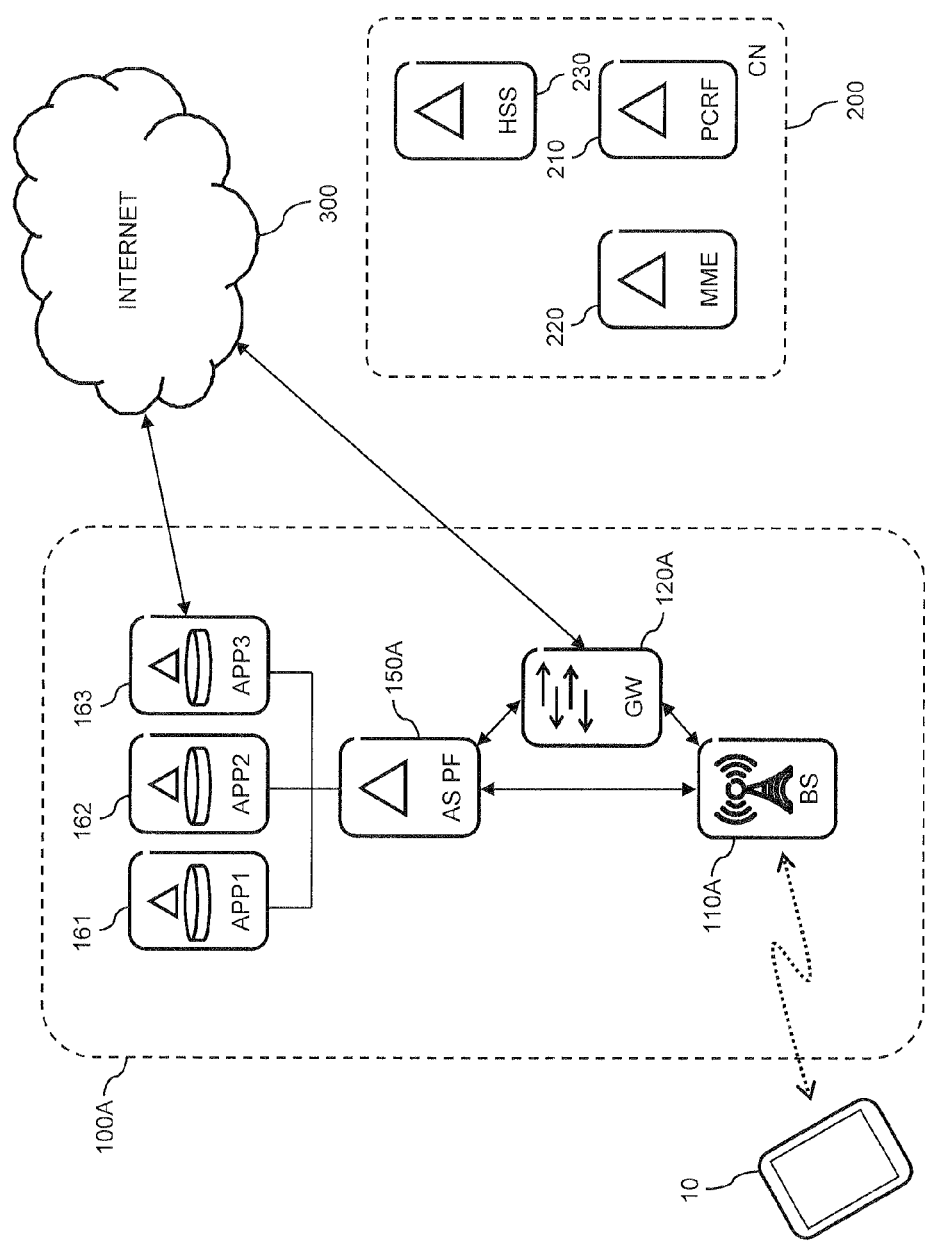
FIG. 2 schematically illustrates an implementation in which an AS platform is provided at a base station of a mobile telecommunications network.

An exemplary implementation of the AS platform at a 3GPP LTE base station (BS), i.e., an eNB, is further illustrated in FIG. 2. In this implementation, a network node 100A includes the BS 110A and the AS platform (AS PF) 150A. By way of example, applications 161, 162, 163 are illustrated as being implemented on the basis of the AS platform 150A. Further, the network node 100A also includes a gateway node (GW) 120A for carrying user plane data between the UE 10 and the Internet 300. In accordance with the illustrated LTE scenario, the gateway node 120A may implement a Serving Gateway (SGW) and/or Packet Data Network Gateway (PGW). The network node 100A may be implemented on the basis of a common base platform 105 as illustrated in FIG. 1 and/or on the basis of multiple co-located devices. For example, a device implementing the BS 110A and the AS platform 150A could be co-located with a further device implementing the gateway node 120A, or a device implementing the BS 110A could be co-located with a further device implementing the gateway node 120A and the AS platform 150A. In the following, co-location of certain nodes is considered to cover both implementation of the nodes in the same device, e.g., on the basis of a common base platform as illustrated in FIG. 1, and implementation of the nodes in different but co-located devices.

Further, FIG. 2 illustrates exemplary nodes of a CN 200, namely a Policy and Charging Rules Function (PCRF) 210, a Mobility Management Entity (MME) 220, and a Home Subscriber Server (HSS) 230.

In the implementation of FIG. 2, co-locating the gateway node 120A with the BS 110A allows for efficiently using the gateway node 120A as a decision point for selectively directing user plane data of the UE 10 to the AS platform 150A or to the Internet 300. Further, mechanisms of the gateway node 120A can be utilized for applying charging, policy enforcement, and/or lawful interception also to the user plane data between the UE 10 and the AS service platform 150A.

Figure 3:
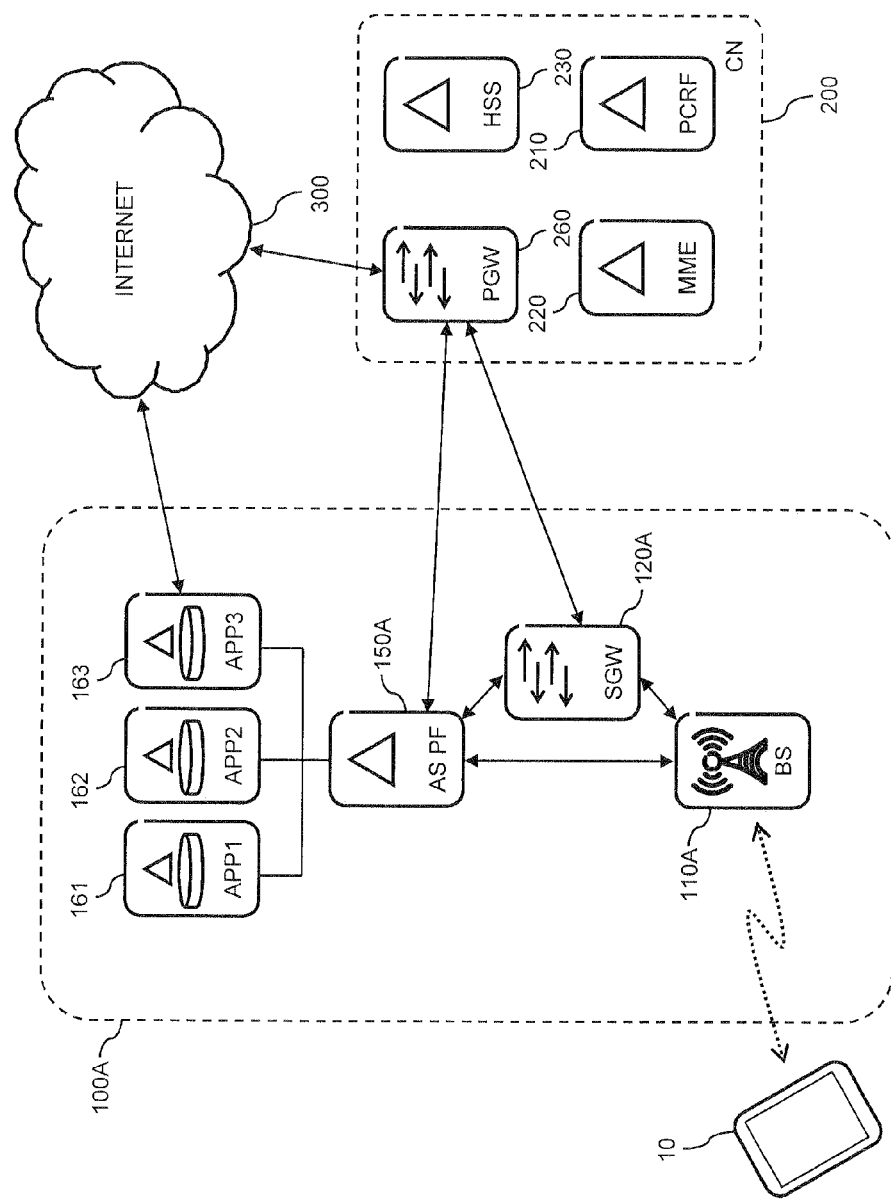
FIG. 3 schematically illustrates a further implementation in which an AS platform is provided at a base station of a mobile telecommunications network.

A further exemplary implementation of the AS platform at a 3GPP LTE BS is illustrated in FIG. 3. As compared to the implementation of FIG. 2, a first gateway node 120A implementing an SGW is co-located with the BS 110A and a second gateway node 260 is located in the CN 200, e.g., at a switching site. In this implementation, the AS platform 150A is arranged, in terms of network communication, between the first gateway node 120A and the second gateway node 260, i.e., between the SGW and the PGW. Accordingly, routing of user plane data between the UE 10 and the Internet 300 may occur via the first gateway node 120A at the BS 110A and via the second gateway node 260 in the CN 200. Routing of user plane traffic between the UE 10 and the AS platform 150A may occur via the first gateway node 120A directly to the AS platform 150A, without passing the second gateway node 260.

Figure 4:
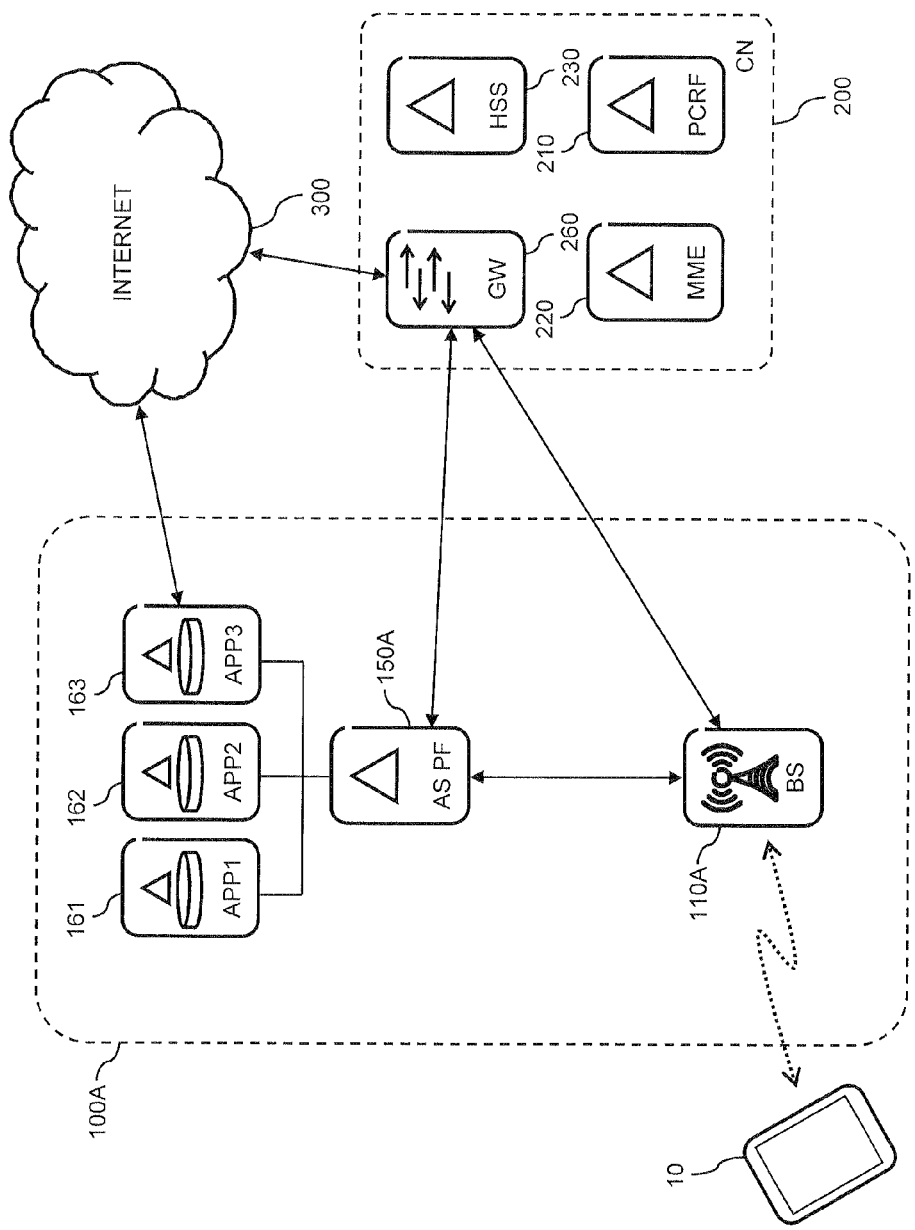
FIG. 4 schematically illustrates a further implementation in which an AS platform is provided at a base station of a mobile telecommunications network.

A still further exemplary implementation of the AS platform at a 3GPP LTE BS is illustrated in FIG. 4. As compared to the implementations of FIGS. 2 and 3, a gateway node 260 is located in the CN 200, e.g., at a switching site. The gateway node 260 may implement an SGW and/or PGW. In this implementation, the AS platform 150A is arranged, in terms of network communication, below the gateway node 260, i.e., below the SGW and the PGW. Accordingly, routing of user plane data between the UE 10 and the Internet 300 may occur via the gateway node 260 in the CN 200. Routing of user plane traffic between the UE 10 and the AS platform 150A may occur via the BS 110A directly to the AS platform 150A, without passing the gateway node 260.

Figure 5:
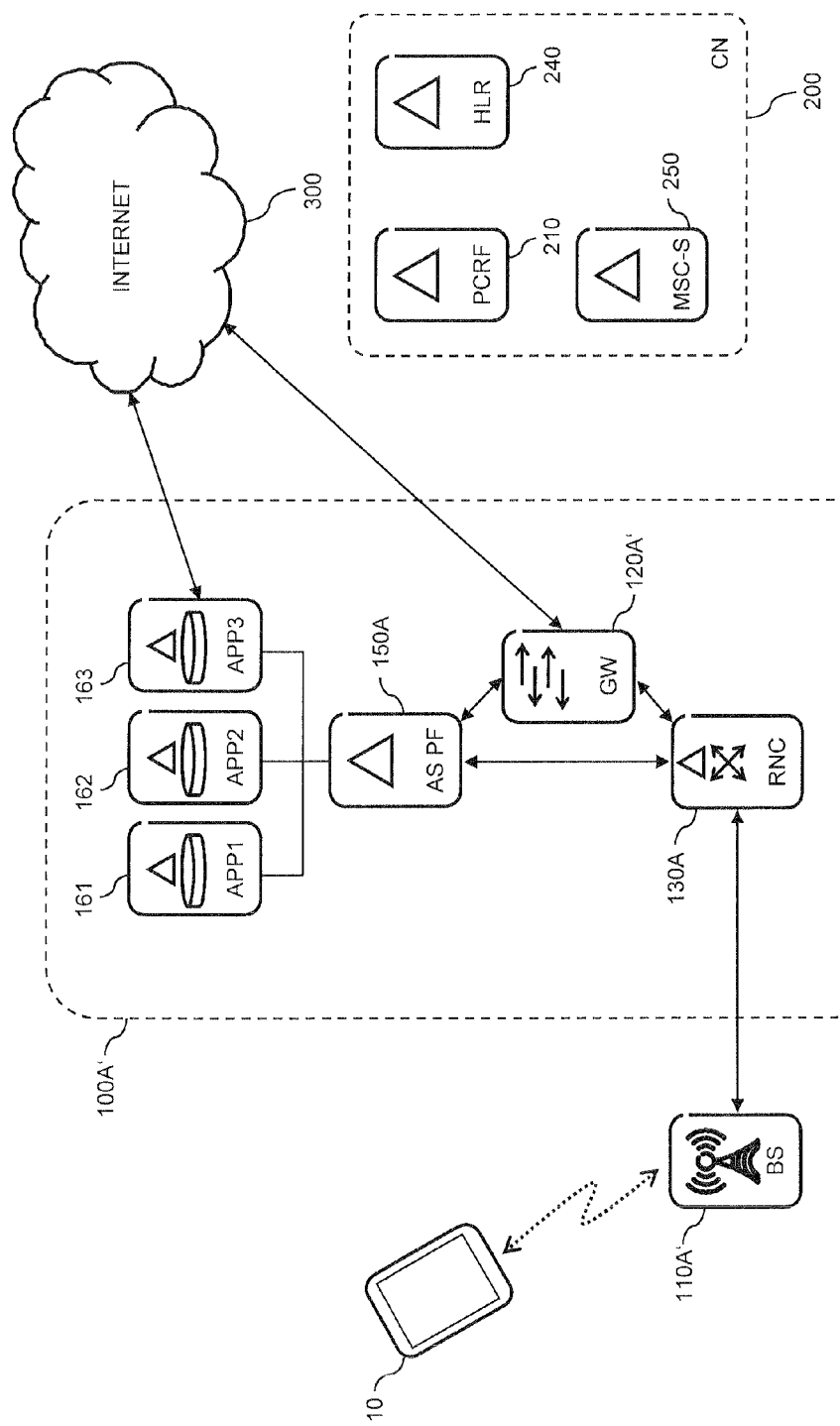
FIG. 5 schematically illustrates an implementation in which an AS platform is provided at a controller of a base station of a mobile telecommunications network.

FIG. 5 illustrates an exemplary implementation of the AS platform at a radio network controller (RNC), e.g., at an RNC in a UTRAN or a Base Station Controller (BSC) in a Global System for Mobile Communications Radio Access Network (GERAN) supporting General Packet Radio Service (GPRS). In this implementation, a network node 100A' includes the RNC 130A and the AS platform 150A. By way of example, applications 161, 162, 163 are illustrated as being implemented on the basis of the AS platform 150A. Further, the network node 100A' also includes a gateway node (GW) 120A' for carrying user plane data between the UE 10 and the Internet 300. In this scenario, the gateway node 120A' may implement a Serving GPRS Support Node (SGSN) and/or Gateway GPRS Support Node (GGSN). The network node 100A' may be implemented on the basis of a common base platform 105 as illustrated in FIG. 1 and/or on the basis of multiple co-located devices. For example, a device implementing the RNC 130A and the AS platform 150A could be co-located with a further device implementing the gateway node 120A', or a device implementing the RNC 130A could be co-located with a further device implementing the gateway node 120A' and the AS platform 150A. In some implementations, also the BS 110A' could be co-located with the network node 100A', e.g., when assuming an architecture with combined BS 110A' and RNC 130A, such as in GPRS with High Speed Packet Access (HSPA).

In the implementation of FIG. 5, co-locating the gateway node 120A' with the RNC 130A and the AS platform 150A allows for efficiently using the gateway node 120A' as a decision point for selectively directing data traffic of the UE 10 to the AS platform 150A or to the Internet 300. Further, mechanisms of the gateway node 120A' can be utilized for applying charging, policy enforcement, and/or lawful interception also to the data traffic between the UE 10 and the AS service platform 150A.

In the implementations of FIGS. 2 to 5, the UE 10 may use an application service provided by one of the applications 161, 162, 163. The user plane data would then be routed to the AS platform 150A and to the corresponding application 161, 162, 163. This application 161, 162, 163 may in turn access the Internet 300 as needed. Through the AS platform 150A, in particular through a NIS functionality as mentioned above, the application may also obtain information on the UE 10 as available from UE context data at the BS 110A or at the RNC 130A, e.g., GUTI, RNTI, RRC State indication, serving cell RSRP or Ec/No ratio, CQI, UE transmit power, or the like. Such information will in the following also be referred to as UE context data of the access node. As used herein, the UE context data of the access node include information related to the UE which are available at the access node. The UE context data may vary from one access node to the other. The UE context data of the access node is typically radio related and may include temporary identifiers such as GUTI or RNTI. UE context data may also be available at other nodes, e.g., at the gateway nodes 120A, 120A'. UE context data of such gateway nodes is typically related to a subscription of the UE and may include permanent identifiers such as IMSI, IMEI, or MSISDN.

In addition, the application may also obtain information on the access node itself, i.e., on the BS 110A or the RNC 130A. Such information may include a number of connected UEs, an average transmit power, an average cell throughput, an average delay of buffered packets, and/or an average HS code utilization as mentioned above. Through the AS platform 150A the application may also obtain information on the UE 10 as available at the gateway node 120A/120A' or 260, e.g., IMSI, IMEI, IP address, or the like.

The concepts as illustrated in the following have the purpose of addressing situations in which the UE is connected to one access node and uses an application running on the AS platform at this access node, and then performs a handover to another access node equipped with such AS platform. As used herein, a handover is considered to be a procedure in which the UE changes between different connection configurations involving one or both of the access nodes, including handover from one BS to another, soft handover procedures, and serving RNC relocation procedures. Although the concepts will be explained in relation to an architecture in which a gateway node is co-located with the access node and the AS platform as illustrated in FIGS. 2 and 5, it is to be understood that the concepts could also be applied in connection with other arrangements of gateway nodes, e.g., as illustrated in FIGS. 3 and 4.

If the gateway node is co-located with the access node and the AS platform, RAN information available at the access node and optionally also CN information available at the gateway node may be obtained at the access node to which the UE is connected. However, due to a handover of the UE, this access node may become different from the access node at which the AS service platform providing the application service is located. This may require continued provision of information from the access node to which the UE is connected to a remote AS platform. In some situations, e.g., in the case of an application service with low latency requirements, such transfer of information may cause undesirable delay.

If the gateway node is not co-located with the access node and the AS platform, similar problems may arise. Further, in such arrangements anchoring the application service at a particular access node may require complex routing of user plane traffic between the UE and the remote AS platform.

In order to address such situations, the concepts as described herein involve that a context of the UE at a first AS platform is moved to a second AS platform when the UE is handed over from a source access node co-located with first AS platform to a target access node co-located with the second AS platform. In this connection, the context of the UE is considered to include UE related information as available at the AS platform and used for providing the application service(s). Such information will in the following also be referred to as AS platform context data of the UE. Moving of the context typically includes transferring AS platform context data of the UE from the first AS platform to the second AS platform and also moving the responsibility of maintaining or updating the AS platform context data of the UE as typically accomplished by execution of the corresponding application. This moving of the context may be accomplished at the handover, i.e., in connection with and typically before, during or after the handover of the UE, e.g., in the course of a handover preparation procedure or in connection with handover confirmation signalling after completing the handover. The handover may involve switching of the connection of the UE from one access node to another access node, and may be accomplished with handover preparation signalling or without handover preparation signalling. The process of moving the context may be performed in connection with the handover procedure, e.g., be triggered together with or by the handover procedure. Accordingly, handover related control signalling may at least in part be used for the moving of the context. By moving the context of the UE between the AS platforms, the application service can be provided to the UE via the AS platform at the access node to which the UE is connected, and delays and complex transfer of information can be avoided. By using handover related control signalling for moving the context, early relocation of the application service to the AS platform at the target access node becomes possible.

In some implementations, the source access node may provide an indication of the handover to the first AS platform at the source access node. This indication may for example indicate that a handover of the UE to the target access node is may be required. This indication may be accomplished before handover preparation signalling, in parallel to handover preparation signalling, or after handover preparation signalling. The source access node may also provide an identity of the target access node to the second AS platform. The first AS platform may also provide a corresponding indication to the application(s) running on the first AS platform.

In response to the indication, the first AS platform at the source access node may initiate the moving of the context to the second AS platform at the target access node, e.g., by application layer signalling between the first AS platform and the second AS platform. Application layer signalling may also be used for sending the AS platform context data of the UE from the first AS platform to the second AS platform. In such processes, the first AS platform may use the identity of the target access node for locating the second AS platform.

In some implementations, the source access node may obtain the AS platform context data from the first AS platform at the source access node and sending the AS platform context data the target access node, e.g., in a handover preparation message. For such purposes, one or more RAN Transparent containers may be used. The RAN transparent containers are information elements in which any information can be inserted. The inserted information will be transferred unmodified, i.e., transparently, from the source access node to the target access node. The target access node may then receive the AS platform context data from the source access node and provide the AS platform context data to the second application service platform at the target access node.

In some implementations, the target access node may obtain an identity of the source access node, e.g., during handover preparation signalling, and provide the identity of the source access node to the second AS platform at the target access node. The second AS platform may then use the identity of the source access node to locate the first AS platform at the source access node from which the AS platform context data of the UE can be obtained. Accordingly, the second AS platform at the target access node may use the identity of the source access node for obtaining the AS platform context data from the first AS platform at the source access node. The second AS platform at the target access node may obtain the AS platform context data by application layer signalling with the first AS platform at the source access node.

Figure 6:
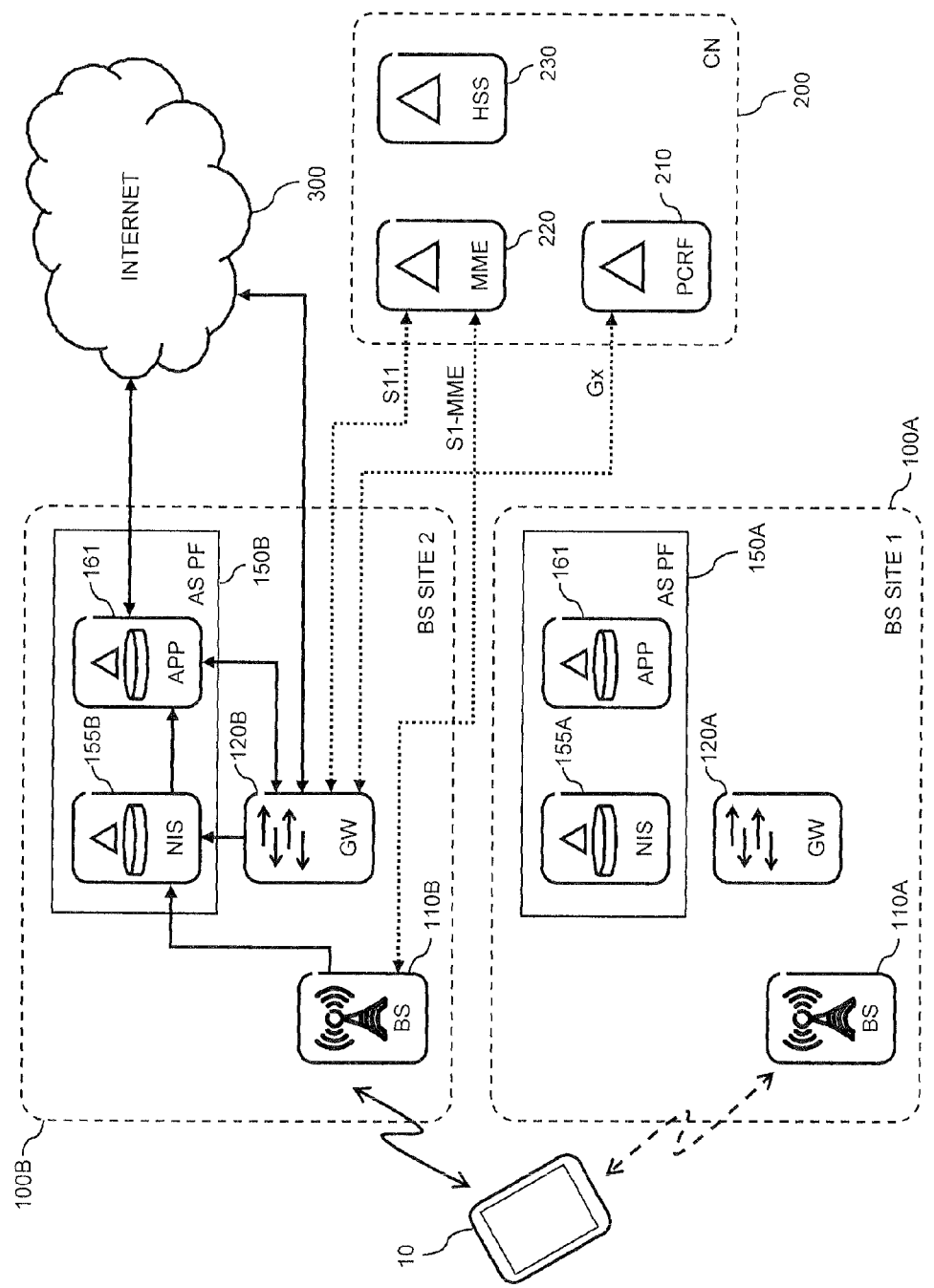
FIG. 6 schematically illustrates a handover scenario in which concepts according to an embodiment of the invention may be applied.

FIG. 6 schematically illustrates a handover scenario in which the above concepts may be applied. In particular, FIG. 6 illustrates the network node 100A of FIG. 2 and a further network node 100B having similar structures as the network node 100A. More specifically, the network node 100B includes a further BS 110B and an AS platform 150B. Accordingly, the AS platform 150A is provided at a site of the BS 110A (BS site 1), and the AS platform 150B is provided at a site of the further BS 110B (BS site 2). The further network node 100B also includes a further gateway node 120B. In accordance with the illustrated LTE scenario, the further gateway node 120B may implement an SGW and/or PGW.

In FIG. 6 also a NIS functionality 155A of the AS platform 150A is illustrated, which has the purpose of aggregating information from the BS 110A, e.g., information relating to the UE 10 while connected to the BS 110A and optionally information on the BS 110A itself, and information from the gateway node 120A so as to expose it to applications. A similar NIS functionality 155B is provided at the further AS platform 150B and has the purpose of aggregating information from the further BS 110B, e.g., information related to the UE 10 while connected to further BS 110B and optionally information on the further BS 110B itself, and information from the further gateway node 120B. The NIS functionalities 155A, 155B may be implemented as application running on the respective AS platform 150A, 150B. In FIG. 6, an application 161 is illustrated as being implemented on the basis of the AS platform 150A. The same application 161 is also be implemented on the basis of the AS platform 150B.

In the scenario of FIG. 6, it is assumed that the UE 10 initially was connected to the telecommunications network via the BS 110A and an application service was provided to the UE 10 through the application 161 running on the AS platform 150A, and the UE 10 was then handed over to the further BS 110B. In the course of this handover, also the application service provided by the application 161 was relocated from the AS platform 150A at the BS 110A to the further AS platform 150B at the BS 110B. In the illustrated resulting situation, the UE 10 then uses the further BS 110B for connecting to the telecommunications network, and the application service is provided to the UE 10 by the application 161 running on the further AS platform 150B.

Further, FIG. 6 illustrates the PCRF 210, MME 220, and HSS 230. From such CN nodes, control plane connections to the nodes of the RAN serving the UE 10 may be established. In the illustrated example, the PCRF 210 has a control plane connection to the gateway node 120B, via an interface referred to as Gx, and the MME has a control plane connection to the gateway node 120B, via an interface referred to as S11, and a control plane connection to the further BS 110B, via an interface referred to as S1-MME.

Figure 7:
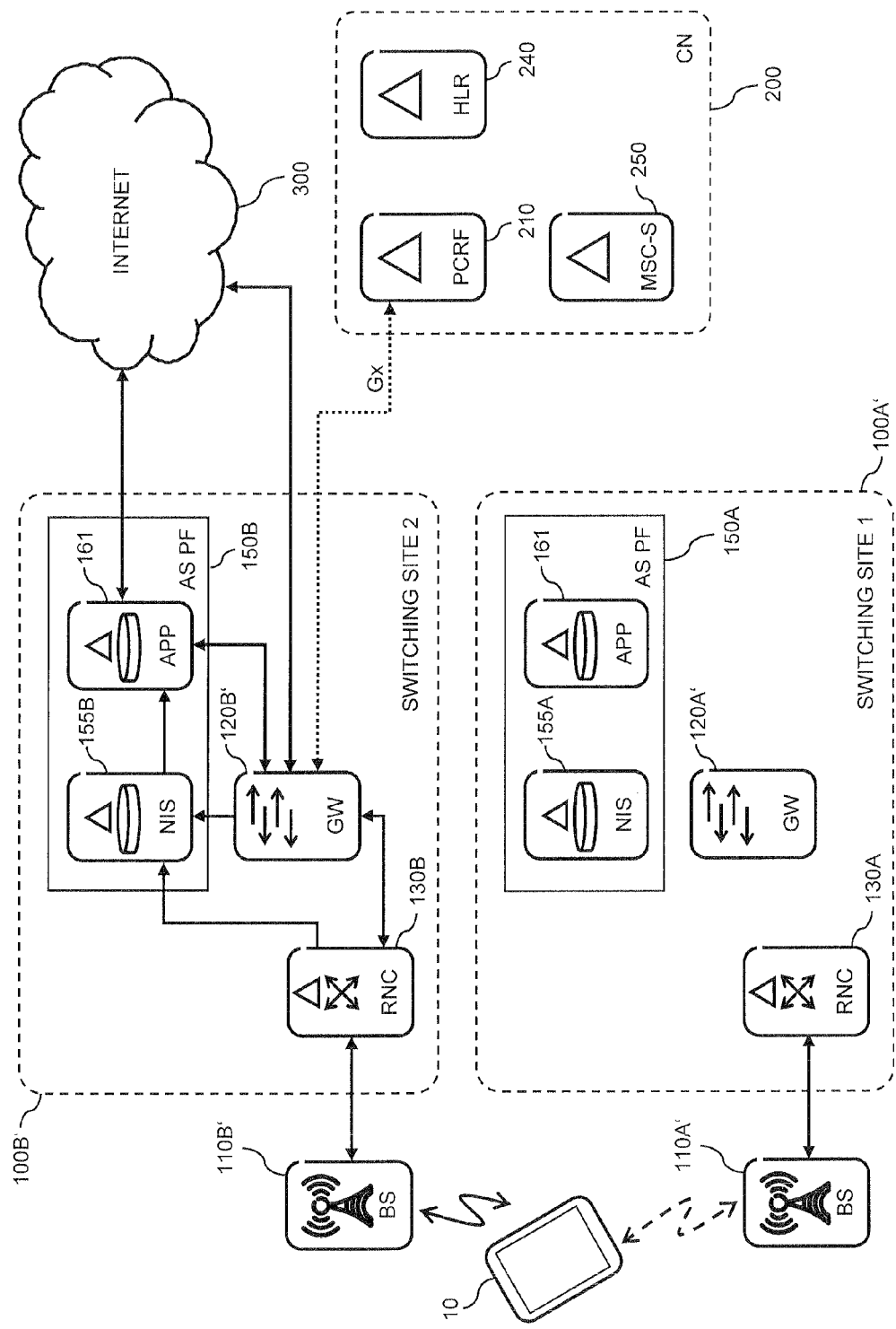
FIG. 7 schematically illustrates a further handover scenario in which concepts according to an embodiment of the invention may be applied.

FIG. 7 schematically illustrates a further handover scenario in which the above concepts may be applied. In particular, FIG. 7 illustrates the network node 100A' of FIG. 5 and a further network node 100B' having similar structures as the network node 100A'. More specifically, the network node 100B' includes a further RNC 130B and an AS platform 150B. The RNC 130A is assumed to be located at a first local switching site (switching site 1) and the further RNC 130B is assumed to be located at a second local switching site (switching site 2). The further network node 100B' also includes a further gateway node 120B'. In accordance with the illustrated GPRS scenario, the further gateway node 120B' may implement an SGSN and/or GGSN.

In FIG. 7 also a NIS functionality 155A of the AS platform 150A is illustrated, which has the purpose of aggregating information from the RNC 130A, e.g., information related to the UE 10 while connected to the RNC 130A and optionally information on the RNC 130A itself, and information from the gateway node 120A' so as to expose it to applications. A similar NIS functionality 155B is provided at the further AS platform 150B and has the purpose of aggregating information from the further RNC 110B, e.g., information related to the UE 10 while connected to further RNC 130B and optionally information on the further RNC 130B itself, and information from the further gateway node 120B'. The NIS functionalities 155A, 155B may be implemented as application running on the respective AS platform 150A, 150B. In FIG. 7, an application 161 is illustrated as being implemented on the basis of the AS platform 150A. The same application 161 is also be implemented on the basis of the AS platform 150B.

In the scenario of FIG. 7, it is assumed that the UE 10 initially was connected via the RNC 130A and BS 110A', and an application service was provided to the UE 10 through the application 161 running on the AS platform 150A, and that the UE 10 was then handed over to the further BS 110B' and RNC 130B. In the course of this handover, also the application service provided by the application 161 was relocated from the AS platform 150A at the BS 110A' to the further AS platform 150B. In the illustrated resulting situation, the UE 10 then uses the further BS 110B' for connecting to the telecommunications network, and the application service is provided to the UE 10 by the application 161 running on the further AS platform 150B.

Further, FIG. 7 illustrates the PCRF 210, HLR 240, and MSC-S 250. From such CN nodes, control plane connections to the nodes of the RAN serving the UE 10 may be established. In the illustrated example, the PCRF 210 uses the Gx interface for establishing a control plane connection to the gateway node 120B'.

Figure 8:
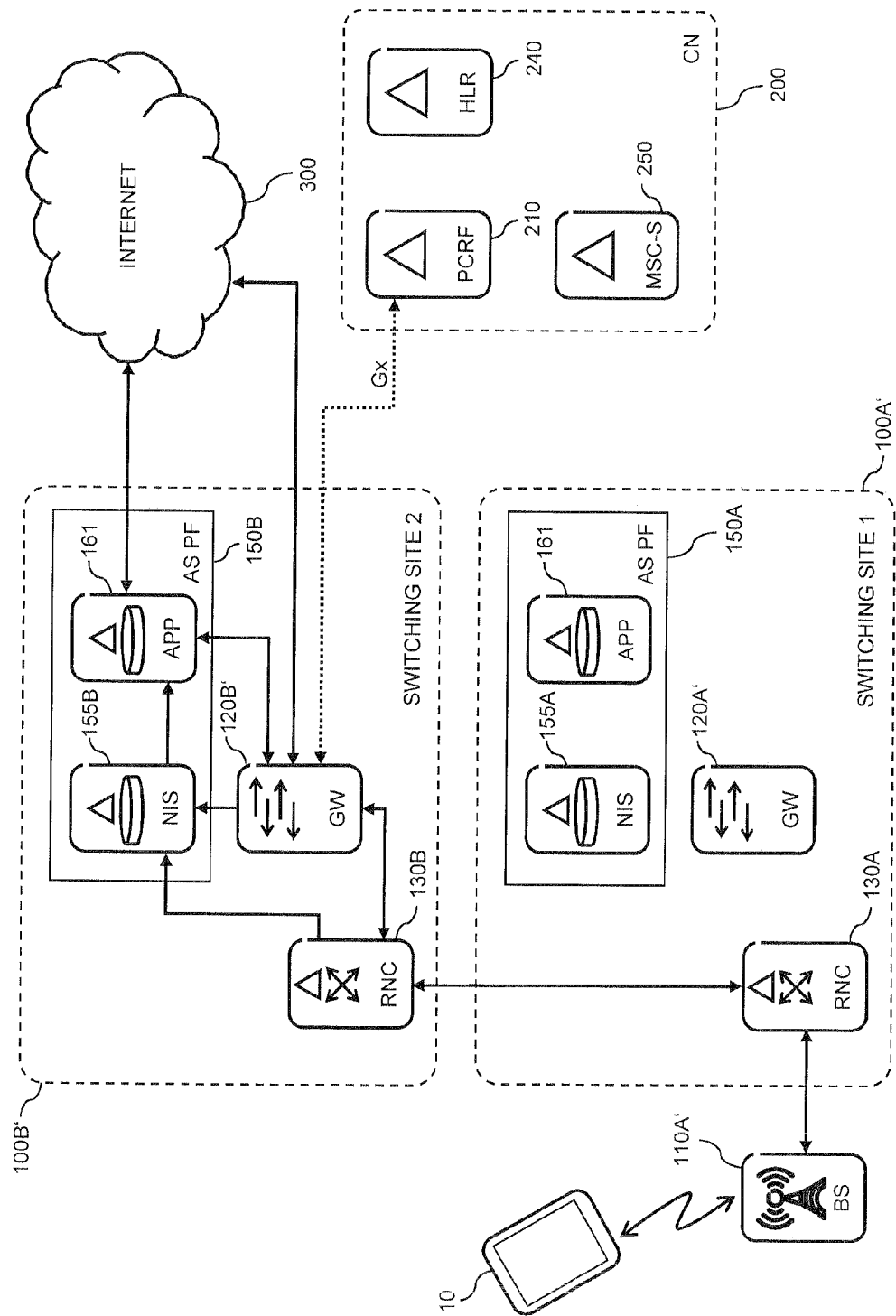
FIG. 8 schematically illustrates a further handover scenario in which concepts according to an embodiment of the invention may be applied.

FIG. 8 illustrates a still further handover scenario in which the above concepts may be applied. The handover scenario of FIG. 8 is based on the same architecture as that of FIG. 7. However, in this case the UE 10 stays connected to the BS 110A' while the RNC serving the UE 10 is changed from the RNC 130A to the RNC 130B. This may for example occur if a soft handover involving the BS 110A' and one or more BSs controlled by the RNC 130B (not illustrated in FIG. 8) is combined with a serving RNC relocation. In the illustrated resulting situation, at least a part of the connection between the UE 10 and the telecommunications network is established via the BS 110A', the RNC 130A, and the further RNC 130B, using an interface between the RNC 130A and the further RNC 130B, referred to as Iur.

In the following, exemplary procedures for implementing the relocation of the application service from a first AS platform (AS PF 1) 150A at the source access node (AN1) 110A/130A of a handover to a second AS platform (AS PF 2) 150B at the target access node (AN2) 110B/130B of the handover will be further explained by referring to the signalling diagrams of FIGS. 9 to 11. As indicated by the reference numerals, the access nodes may correspond to the above BSs 110A, 110B or to the above RNCs 130A, 130B.

Figure 9:
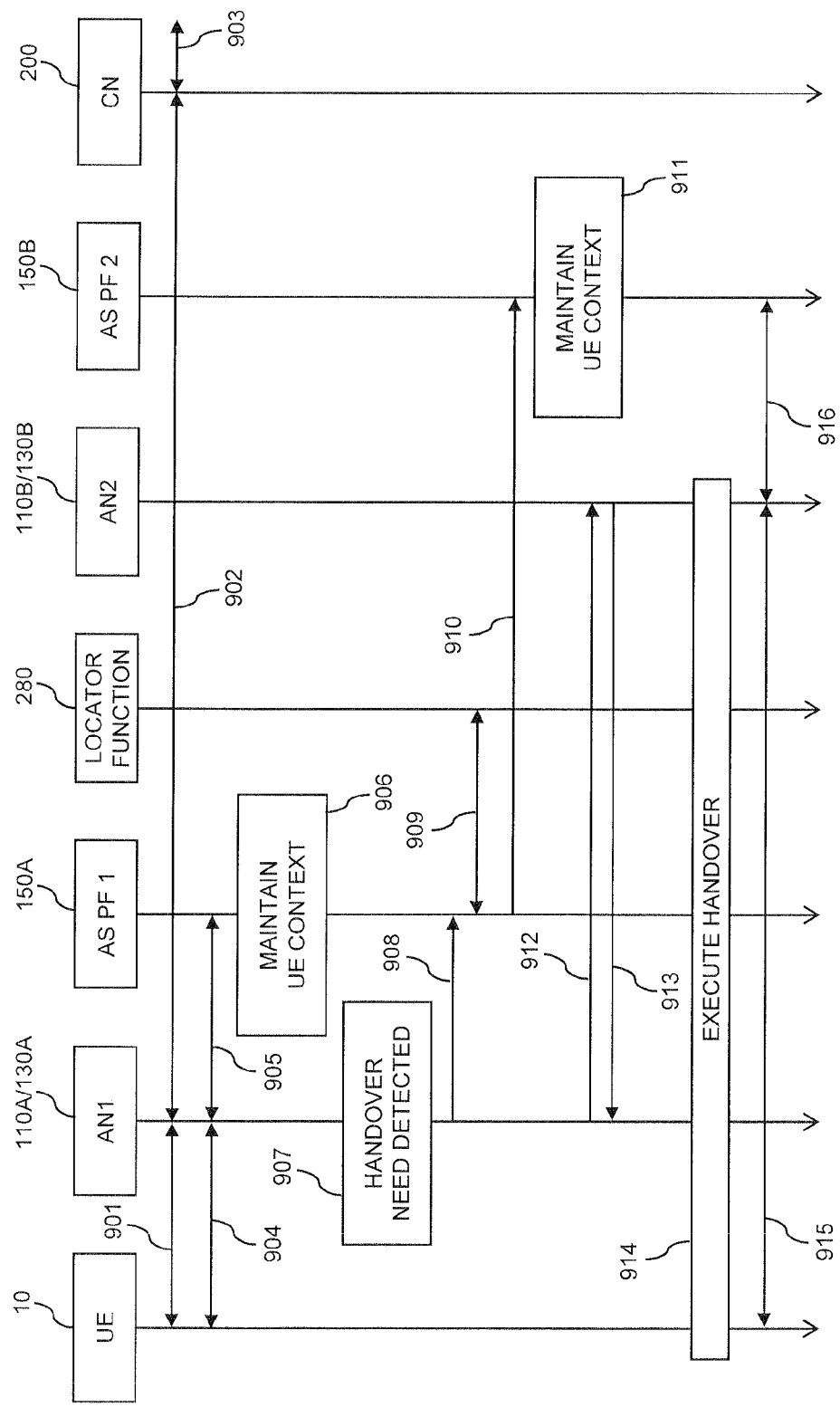
FIG. 9 shows a timing diagram for illustrating procedures for application service relocation according to an embodiment of the invention.

In the exemplary procedures of FIG. 9, the source access node 110A/130A informs the AS platform 150A at the source access node 110A/130A that a handover of the UE 10 to another access node, i.e., to the target access node 110B/130B may be required. This may also include informing the application(s) running on the first AS platform 150A of the anticipated handover. In the procedures of FIG. 9, the indication of the anticipated handover is included in handover preparation signalling between the source access node 110A/130A and the target access node 110B/130B.

Initially, a situation as for example illustrated in FIGS. 2 to 5 may exist. That is to say, the UE 10 may be connected via the source access node 110A/130A, and the UE 10 may access the CN 200 and/or the Internet via the source access node 110A/130A, as illustrated by messages 901, 902, and 903. Further, one or more application services may be provided to the UE 10 by executing one or more applications on the AS platform 150A at the source access node 110A/130A, as illustrated by messages 904, 905. In such situation, a context of the UE 10 is maintained at the AS platform 150A at the source access node 110A/130A, as illustrated by step 906.

Maintaining the context of the UE 10 at the AS platform 150A involves storing and/or updating AS platform context data related to the UE 10 and to the application(s) running on the AS platform 150A for providing the application service to the UE 10. The AS platform context data typically include information related to the application(s) running on the AS platform 150A, e.g., information on used applications, information on transaction states, information on current active sessions, information on open connections, information on packet statistics, or the like. The AS platform context data may also include information related to the UE 10 and/or to a subscriber associated with the UE 10, e.g., IMSI, GUTI, TMSI, RNTI, IMEI, RRC State indication, serving cell RSRP or Ec/No, CQI, transmit power or the like. In some cases, the AS platform context data may also include information related to the source access node itself, e.g., a number of connected UEs, an average transmit power, an average cell throughput, an average delay of buffered packets, and/or an average HS code utilization. Part of the AS platform context data may be provided to the AS platform 150A from the source access node 110A/130A and/or from a gateway node, e.g., the gateway node 120A, 120A'. Another part of the AS platform context data may be generated at the AS platform 150A, e.g., through execution of the application(s) for providing the application service(s) to the UE 10.

As indicated by step 907, in this situation a handover need may be detected by the source access node 110A/130A. For example, measurements performed by the UE 10 and reported to the source access node 110A/130A may indicate that a handover to the target access node 110B/130B is needed. The handover need may also be identified with respect to multiple candidate target access nodes, and some of the following procedures in preparation of the actual handover may be applied in parallel to several or all candidate target access mo. The following explanations will however focus on the access node to which the handover would actually be performed.

By message 908, the source access node 110A/130A indicates the handover need to the AS platform 150A at the source access node 110A/130A. In the illustrated example, this indication also includes the identity of the target access node 110B/130B, e.g., in terms of an identifier of the target access node 110B/130B itself and/or in terms of an identifier of a cell served by the target access node 110B/130B.

The AS platform 150A at the source access node 110A/130A may then locate the AS platform 150B at the target access node 110B/130B. For this purpose, as indicated by messages 909, the AS platform at the source access node 110A/130A may communicate with a locator function 280. The locator function 280 may for example be provided by a node in the CN 200 and be based on databases storing addresses of AS platforms in the telecommunications network in relation to the identity of the access node at which a given AS platform is located. The AS platform 150A may for example locate the AS platform 150B by obtaining an identity of the AS platform 150B at the target access node 110B/130B, e.g., in terms of a network address through which application layer communication with the AS platform 150B is possible.

Using the identity of the AS platform 150B at the target access node 110B/130B, the AS platform 150A at the source access node 110A/130A may then send a message 910 to the AS platform 150B at the target access node 110B/130B. The message 910 may be based on application layer signalling, such as Extensible Markup Language (XML) over Hypertext Transfer Protocol (HTTP), and include a command to move the context of the UE 10 from the AS platform 150A to the AS platform 150B. Further, the message 910 may include the AS platform context data of the UE 10 as currently stored by the AS platform 150A. In some implementations, also separate messages may be used for transmitting the command to move the context and the AS platform context data of the UE 10.

Subsequently, as indicated by step 911, the AS platform 150B at the target access node 110B/130B maintains the context of the UE 10. This may involve storing the AS platform context data as received from the AS platform 150A at the source access node 110B/130B as well as updating the AS platform context data. For this purpose, the application used to provide the application service(s) to the UE 10 may be executed on the AS platform 150B at the target access node 110B/130B.

By messages 912 and 913, the source access node 110A/130A and target access node 110B/130B may then prepare the handover. This may involve various types of handover preparation procedures. For example, if the source and target access nodes 110A, 110B correspond to eNBs, the message 912 may be a handover request transmitted via a direct interface between the eNBs, referred to as X2, and the message 913 may be a handover response transmitted via the X2 interface between the eNBs. Alternatively, other types of messages may be used, e.g., handover preparations transmitted indirectly via an interface to the MME 220, referred to as S1-MME. If the source and target access nodes 110A, 110B correspond to RNCs, handover preparation messages could be transmitted directly via the Iur interface or indirectly via the SGSN.

Handover execution is indicated by step 914. Handover execution typically involves establishing a connection between the UE 10 and the target access node 110B/130B.

After executing the handover, a situation as for example illustrated in FIGS. 6 to 8 may exist. That is to say, the UE 10 is connected to the target access node 110B/130B, and the application service may be provided to the UE 10 via the AS platform 150B at the target access node 110B/130B, as illustrated by messages 915, 916.

Figure 10:
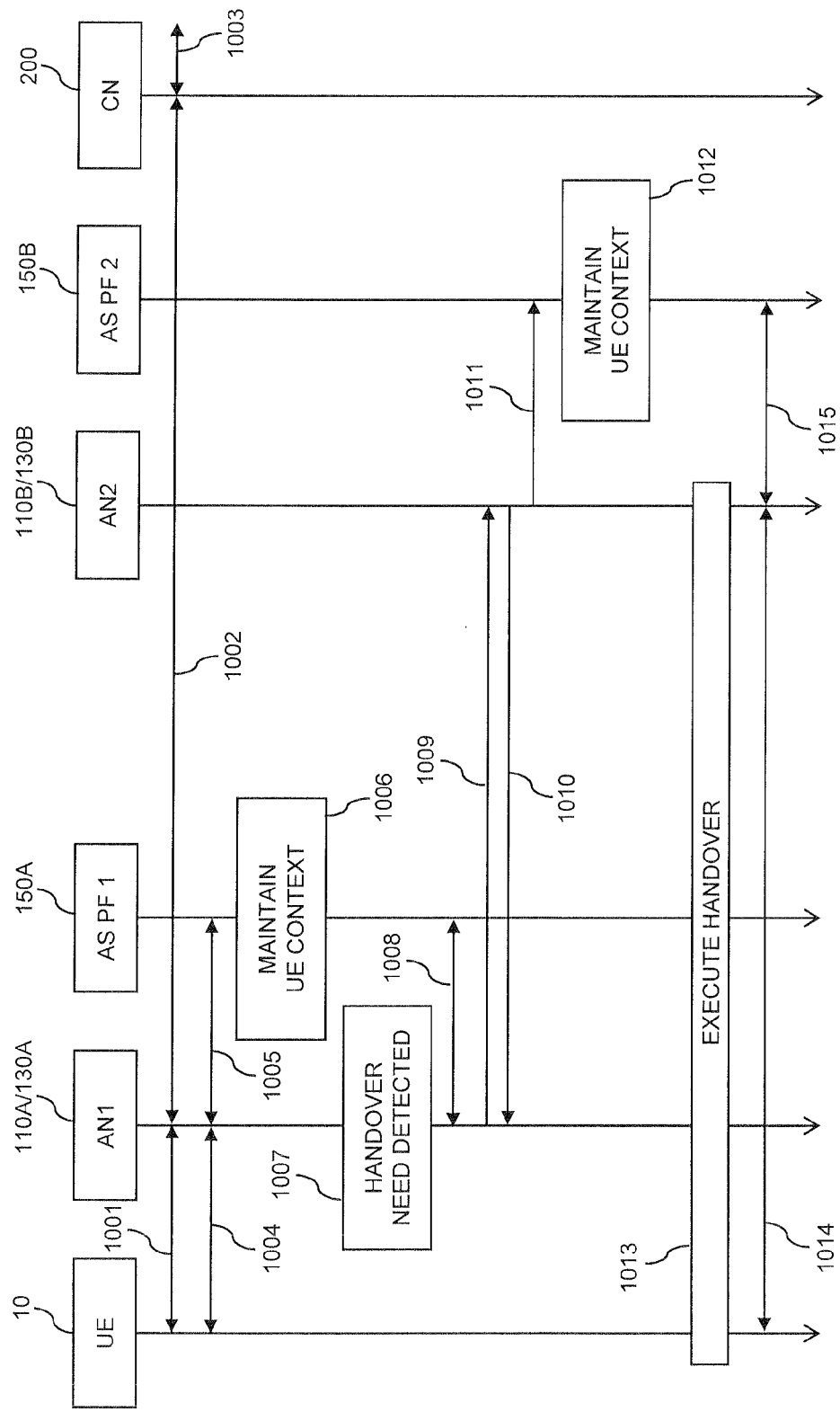
FIG. 10 shows a timing diagram for illustrating further procedures for application service relocation according to an embodiment of the invention.

In the exemplary procedures of FIG. 10, the source access node 110A/130A may request the context of the UE 10 to be moved from the AS platform 150A at the source access node 110A/130A. This is accomplished before handover preparation signalling is performed. The source access node 110A/130A then obtains the AS platform context data of the UE 10 from the AS platform 150A at the source access node 110A/130A and includes the AS platform context data into the handover preparation signalling to the target access node 110B/130B, e.g., into a RAN Transparent container. The target access node 110B/130B can then provide the AS platform context data of the UE 10 to the AS platform 150B at the target access node 110B/130B.

Initially, a situation as for example illustrated in FIGS. 2 to 5 may exist. That is to say, the UE 10 may be connected via the source access node 110A/130A, and the UE 10 may access the CN 200 and/or the Internet via the source access node 110A/130A, as illustrated by messages 1001, 1002, and 1003. Further, one or more application service(s) may be provided to the UE 10 by executing one or more applications on via the AS platform 150A at the source access node 110A/130A, as illustrated by messages 1004, 1005. In such situation, a context of the UE 10 is maintained at the AS platform 150A at the source access node 110A/130A, as illustrated by step 1006.

Maintaining the context of the UE 10 at the AS platform 150A involves storing and/or updating AS platform context data related to the UE 10 and to the application(s) running on the AS platform 150A for providing the application service to the UE 10. The AS platform context data typically include information related to the application(s) running on the AS platform 150A, e.g., information on used applications, information on transaction states, information on current active sessions, information on open connections, information on packet statistics, or the like. The AS platform context data may also include information related to the UE 10 and/or to a subscriber associated with the UE 10, e.g., IMSI, GUTI, TMSI, RNTI, IMEI, RRC State indication, serving cell RSRP or Ec/No, CQI, transmit power or the like. In some cases, the AS platform context data may also include information related to the source access node itself, e.g., a number of connected UEs, an average transmit power, an average cell throughput, an average delay of buffered packets, and/or an average HS code utilization. Part of the AS platform context data may be provided to the AS platform 150A from the source access node 110A/130A and/or from a gateway node, e.g., the gateway node 120A, 120A'. Another part of the AS platform context data may be generated at the AS platform 150A, e.g., through execution of the application(s) for providing the application service(s) to the UE 10.

As indicated by step 1007, in this situation a handover need may be detected by the source access node 110A/130A. For example, measurements performed by the UE 10 and reported to the source access node 110A/130A may indicate that a handover to the target access node 110B/130B is needed.

In response to the handover need, the source access node 110A/130A retrieves the AS platform context data of the UE 10 from the AS platform 150A at the source access node 110A/130A, as illustrated by messages 1008. Messages 1008 may include a request from the source access node 110A/130A to the AS platform 150A at the source access node 110A/130A and a response from the AS platform 150A to the source access node 110A/130A.

By messages 1009 and 1010, the source access node 110A/130A and target access node 110B/130B may then prepare the handover. This may involve various types of handover preparation procedures. For example, if the source and target access nodes 110A, 110B correspond to eNBs, the message 1009 may be a handover request transmitted via a direct interface between the eNBs, referred to as X2, and the message 1010 may be a handover response transmitted via the X2 interface between the eNBs. Alternatively, other types of messages may be used, e.g., handover preparations transmitted indirectly via an interface to the MME 220, referred to as S1-MME. If the source and target access nodes 110A, 110B correspond to RNCs, handover preparation messages could be transmitted directly via the Iur interface or indirectly via the SGSN. The source access node 110A/130A includes the AS platform context data of the UE 10 in an outgoing handover preparation message, and the target access node 110B/130B then receives the AS platform context data with an incoming handover preparation message. As mentioned above, such handover preparation messages may be transmitted directly or indirectly between the source access node 110A/130A and the target access node 110B/130B. The AS platform context data of the UE 10 may be included into a RAN Transparent container of such messages. If the target access node 110B corresponds to an eNB, the information element "Source eNB to Target eNB Transparent Container" as defined in 3GPP Technical Specification 36.413 may be used for this purpose. If the target access node 130B corresponds to a UTRAN RNC, the information element "Source RNC to Target RNC Transparent Container" as defined in 3GPP Technical Specification 25.413 may be used for this purpose. If the target access node 130B corresponds to a GERAN BSC, the information element "Source BSS to Target BSS Transparent Container" as defined in 3GPP Technical Specification 48.018 may be used for this purpose.

The target access node 110B/130B then provides the received AS platform context data to the AS platform 150B at the target access node 110B/130B, as indicated by message 1011.

Subsequently, as indicated by step 1012, the AS platform 150B at the target access node 110B/130B maintains the context of the UE 10. This may involve storing the AS platform context data as received through the handover preparation signalling as well as updating the AS platform context data. For this purpose, the application used to provide the application service(s) to the UE 10 may be executed on the AS platform 150B at the target access node 110B/130B.

Handover execution is indicated by step 1013. Handover execution typically involves establishing a connection between the UE 10 and the target access node 110B/130B.

After executing the handover, a situation as for example illustrated in FIGS. 6 to 8 may exist. That is to say, the UE 10 is connected to the target access node 110B/130B, and the application service may be provided to the UE 10 via the AS platform 150B at the target access node 110B/130B, as illustrated by messages 1014, 1015.

Figure 11:
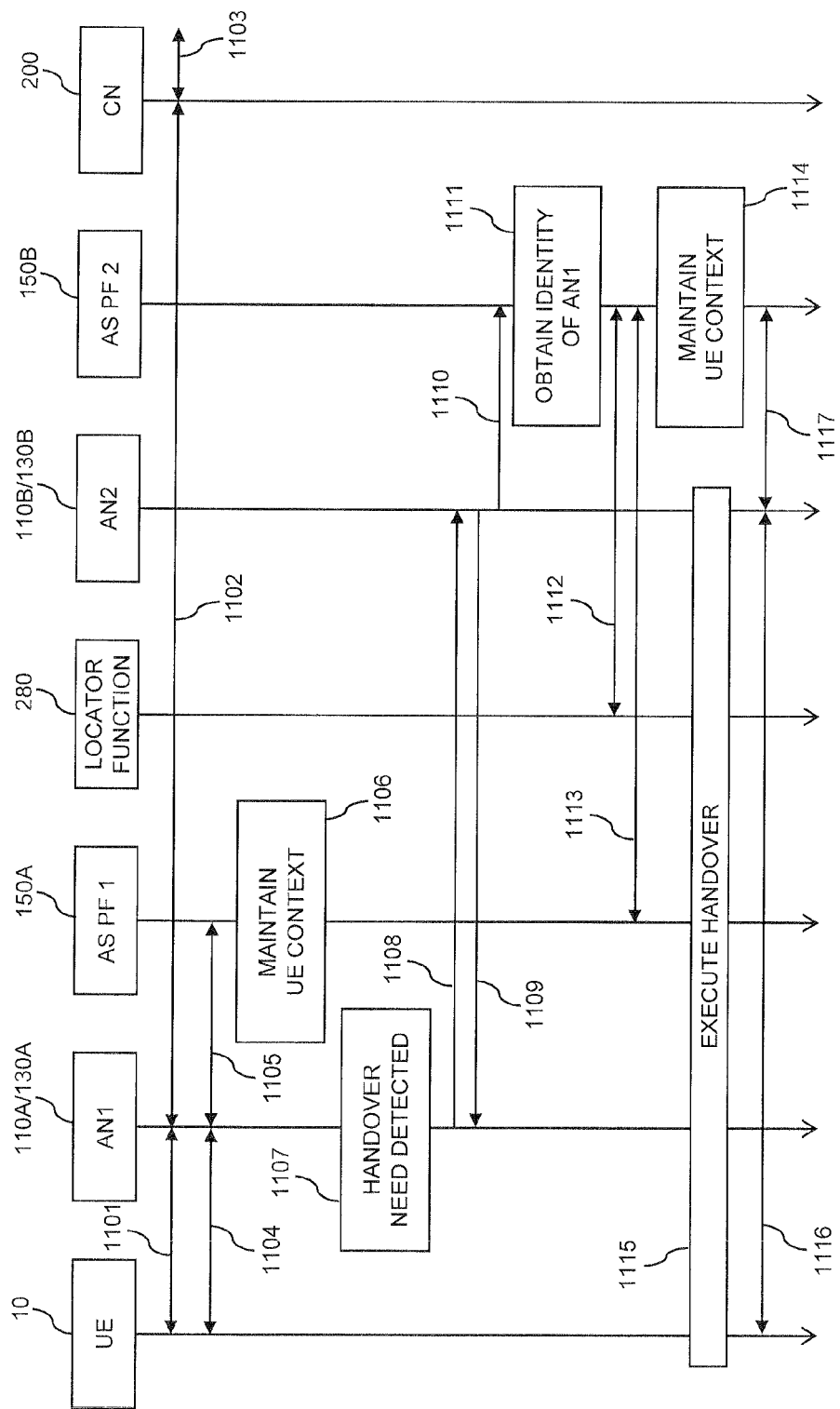
FIG. 11 shows a timing diagram for illustrating further procedures for application service relocation according to an embodiment of the invention.

In the procedures of FIG. 11, the target access node 110B/130B uses handover preparation signalling to obtain information about the source access node 110A/130A, in particular an identity of the source access node 110A/130A, e.g., in terms of an identifier if the source access node 110A/130A itself and/or an identifier of a cell served by the source access node 110A/130A. The target access node 110B/130B then provides this information to the AS platform 150B at the target access node 110B/130B. The AS platform 150B at the target access node 110B/130B may then use this information to locate the AS platform 150A at the source access node 110A/130A and retrieve the AS platform context data of the UE 10.

Initially, a situation as for example illustrated in FIGS. 2 to 5 may exist. That is to say, the UE 10 may be connected via the source access node 110A/130A, and the UE 10 may access the CN 200 and/or the Internet via the source access node 110A/130A, as illustrated by messages 1101, 1102, and 1103. Further, one or more application services may be provided to the UE 10 by executing one or more applications on the AS platform 150A at the source access node 110A/130A, as illustrated by messages 1104, 1105. In such situation, a context of the UE 10 is maintained at the AS platform 150A at the source access node 110A/130A, as illustrated by step 1106.

Maintaining the context of the UE 10 at the AS platform 150A involves storing and/or updating AS platform context data related to the UE 10 and to the application(s) running on the AS platform 150A for providing the application service to the UE 10. The AS platform context data typically include information related to the application(s) running on the AS platform 150A, e.g., information on used applications, information on transaction states, information on current active sessions, information on open connections, information on packet statistics, or the like. The AS platform context data may also include information related to the UE 10 and/or to a subscriber associated with the UE 10, e.g., IMSI, GUTI, TMSI, RNTI, IMEI, RRC State indication, serving cell RSRP or Ec/No, CQI, transmit power or the like. In some cases, the AS platform context data may also include information related to the source access node itself, e.g., a number of connected UEs, an average transmit power, an average cell throughput, an average delay of buffered packets, and/or an average HS code utilization. Part of the AS platform context data may be provided to the AS platform 150A from the source access node 110A/130A and/or from a gateway node, e.g., the gateway node 120A, 120A'. Another part of the AS platform context data may be generated at the AS platform 150A, e.g., through execution of the application(s) for providing the application service(s) to the UE 10.

As indicated by step 1107, in this situation a handover need may be detected by the source access node 110A/130A. For example, measurements performed by the UE 10 and reported to the source access node 110A/130A may indicate that a handover to the target access node 110B/130B is needed.

By messages 1108 and 1109, the source access node 110A/130A and target access node 110B/130B may then prepare the handover. This may involve various types of handover preparation procedures. For example, if the source and target access nodes 110A, 110B correspond to eNBs, the message 1108 may be a handover request transmitted via a direct interface between the eNBs, referred to as X2, and the message 1109 may be a handover response transmitted via the X2 interface between the eNBs. Alternatively, other types of messages may be used, e.g., handover preparations transmitted indirectly via an interface to the MME 220, referred to as S1-MME. If the source and target access nodes 110A, 110B correspond to RNCs, handover preparation messages could be transmitted directly via the Iur interface or indirectly via the SGSN.

From the received handover preparation message(s), the target access node 110B/130B obtains the identity of the source access node 110A/130A. For example, the received handover preparation messages may include the identity of the source access node 110A/130A in terms of an identifier of the source access node 110A/130A itself and/or in terms of an identifier of a cell served by the source access node 110A/130A. The target access node 110B/130B may store the identity of the source access node 110A/130A, e.g., until a handover decision is taken at the end of handover preparation or until handover execution is successfully completed.

Further, as illustrated by message 1111, the target access node 110B/130B provides the identity of the source access node 110A/130A to the AS platform 150B at the target access node 110B/130B. In the example of FIG. 11, this is assumed to be accomplished immediately after handover preparation.

The AS platform 150B at the target access node 110B/130B may then locate the AS platform 150A at the source access node 110A/130A. For this purpose, as indicated by messages 1112, the AS platform 150B at the target access node 110B/130B may communicate with a locator function 280. The locator function 280 may for example be provided by a node in the CN 200 and be based on databases storing addresses of AS platforms in the telecommunications network in relation to the identity of the access node at which a given AS platform is located. The AS platform 150B may for example locate the AS platform 150A by obtaining an identity of the AS platform 150A at the source access node 110A/130A, e.g., in terms of a network address through which application layer communication with the AS platform 150A is possible.

Using the identity of the AS platform 150A at the source access node 110A/130A, the AS platform 150B at the target access node 110B/130B may then communicate with the AS platform 150A at the source access node 110A/130A to retrieve the AS platform context data of the UE 10 from the AS platform 150A, as illustrated by messages 1113. The messages 1113 may be based on application layer signalling, such as XML over HTTP, and include a request for the AS platform context data, which is transmitted from the AS platform 150B to the AS platform 150A, and a response to such request, which is transmitted from the AS platform 150A to the AS platform 150B. Such response may include the AS platform context data of the UE 10 as currently stored by the AS platform 150A.

Subsequently, as indicated by step 1114, the AS platform 150B at the target access node 110B/130B maintains the context of the UE 10. This may involve storing the AS platform context data as received from the AS platform 150A at the source access node 110B/130B as well as updating the AS platform context data. For this purpose, the application used to provide the application service(s) to the UE 10 may be executed on the AS platform 150B at the target access node 110B/130B.

Handover execution is indicated by step 1115. Handover execution typically involves establishing a connection between the UE 10 and the target access node 110B/130B.

After executing the handover, a situation as for example illustrated in FIGS. 6 to 8 may exist. That is to say, the UE 10 is connected to the target access node 110B/130B, and the application service may be provided to the UE 10 via the AS platform 150B at the target access node 110B/130B, as illustrated by messages 1116, 1117.

In the above example, the retrieval of the AS platform context data of the UE 10 is described as being appended to the handover preparation signalling. However, this retrieval could also be performed in relation to some other process, e.g., after completing handover execution at step 1115. The above example can also be modified to cases in which the handover preparation signalling is not performed at all. Instead, the UE may move to the target node without any handover preparation signalling and may provide the source access node identity to the target access node 110B, 130B as part of the connection establishment to the target access node 110B, 130B. The target access node may then provide the source access node identity to the target AS Platform 150B and thereafter the procedures starting with message 1111 may be performed.

In the above procedures, handover preparation signalling may be used to convey information between the source access node 110A/130A and the target access node 110B/130B. Exemplary handover preparation procedures in a 3GPP LTE scenario are further illustrated in FIGS. 12 and 13.

Figure 12:
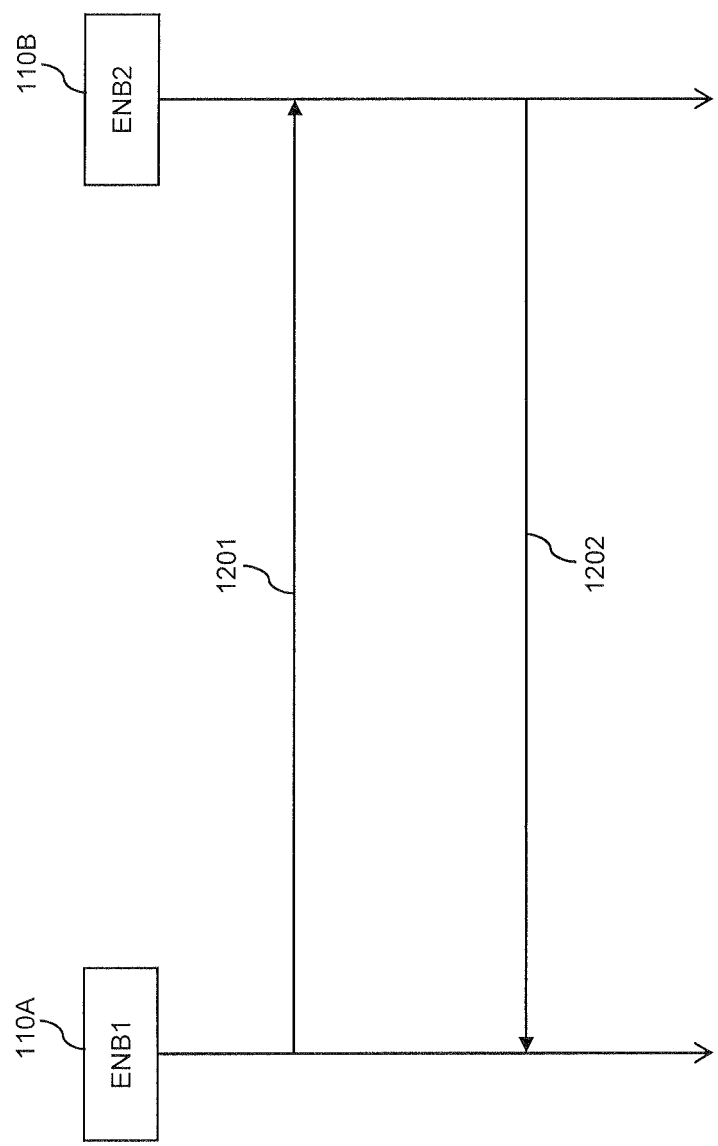
FIG. 12 shows a timing diagram for illustrating a handover preparation procedure which may be used in connection with application service relocation in accordance with an embodiment of the invention.

In FIG. 12 handover preparation over the LTE X2 interface between the source eNB (ENB1) 110A and target eNB (ENB2) 110B is illustrated. As illustrated, the handover preparation procedure involves transmitting a first message 1201, referred to as "Handover Request" from the source eNB 110A to the target eNB 110B. In some implementations, the message 1201 may be used for conveying the command to move the context of the UE 10. Further, the message 1201 may also convey the AS platform context data. For conveying the command and/or AS platform context data the information element referred to as "Source eNB to Target eNB Transparent Container" specified in 3GPP Technical Specification 36.413 may be used.

Further, the handover preparation procedure of FIG. 12 involves transmitting a second message 1202, referred to as "Handover Request Acknowledge" from the target eNB 110B to the source eNB 110A.

Figure 13:
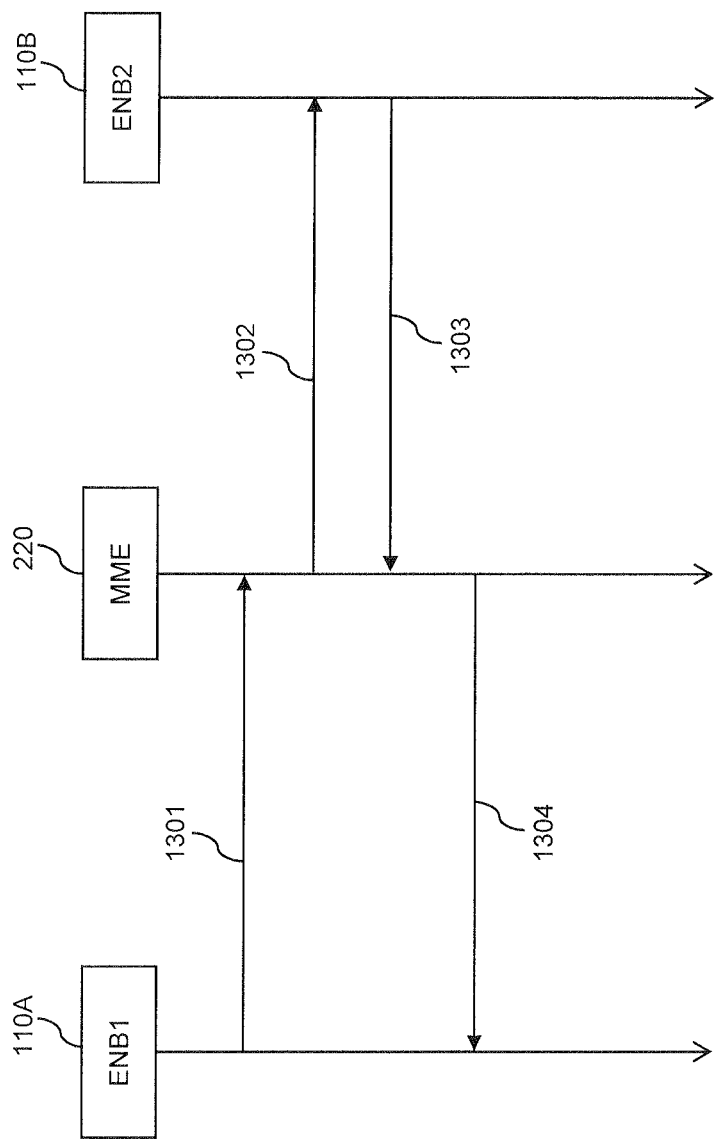
FIG. 13 shows a timing diagram for illustrating a further handover preparation procedure which may be used in connection with application service relocation in accordance with an embodiment of the invention.

In FIG. 13 handover preparation over the LTE S1 interfaces between the source eNB (ENB1) 110A and MME 220 and between the target eNB 110B (ENB2) and MME 220 is illustrated. As illustrated, the handover preparation procedure involves transmitting a first message 1301, referred to as "Handover Required" from the source eNB 110A to the MME 220, and transmitting a second message 1302, referred to as "Handover Request", from the MME 220 to the target eNB 110B. In some implementations, the messages 1301 may be used for conveying the command to move the context of the UE 10. Further, the message 1301, 1302 may also convey the AS platform context data. For conveying the command and/or AS platform context data the information element referred to as "Source eNB to Target eNB Transparent Container" specified in 3GPP Technical Specification 36.413 may be used.

Further, the handover preparation procedure involves transmitting a third message 1303, referred to as "Handover Request Acknowledge" from the target eNB 110B to the MME 220, and transmitting a fourth message 1304, referred to as "Handover Command" from MME 220 to the source eNB 110A.

As can be seen, the concepts as described above may be used for efficiently addressing UE mobility while providing an application service via an AS platform co-located with an access node. This can be achieved by integrating mobility on the application level with handover procedures. In this way, mobility of certain application services relying on detailed information on a UE and its currently used access characteristics can be provided in an efficient manner, e.g., application services based on stateful proxying, stateful packet inspection, or the like.

It is to be understood that the examples and embodiments as explained above are merely illustrative and susceptible to various modifications. For example, the concepts could be used in connection with various types of telecommunications networks, e.g., implementing other types of radio access technologies. Also, it is to be understood that various types of access technology could be combined in the same telecommunications network, e.g., LTE access nodes and UMTS/GPRS access nodes as mentioned above, and that handovers may also occur between such different types of access technologies.

Moreover, it is to be understood that the above concepts may be implemented by using correspondingly designed software to be executed by one or more processors of an existing device, or by using dedicated device hardware. Also, the nodes as described herein may be implemented by a single device or by multiple devices, e.g., a device cloud or server farm.

The invention claimed is:

1. A method for providing an application service to a user equipment operating in a telecommunications network, the method comprising:

serving a user equipment from a first access node in the telecommunications network, including providing an application service to the user equipment via a first application service platform integrated or co-located with the first access node and configured to provide the application service to user equipments served by the first access node;

generating application service platform context data for the user equipment at the first application service platform in conjunction with providing the application service, the application service platform context data comprising information regarding use of the application service by the user equipment;

handing the user equipment over from the first access node to a second access node in the telecommunications network, wherein a second application service platform is integrated or co-located with the second access node and is configured to provide the application service to user equipments served by the second access node; and in conjunction with handing the user equipment over to the second access node, transferring the application service platform context data for the user equipment from the first application service platform to the second application service platform for use in providing the application service to the user equipment after handover, based on the first access node obtaining the application service platform context data for the user equipment from the first application service platform and sending, via handover signaling, the application service platform context for the user equipment to the second access node, for transfer to the second application service platform;

wherein transferring the application service platform context data for the user equipment comprises the first access node providing an indication of the handover to the first application service platform, the first application service platform providing the application service platform context data for the user equipment to the first access node in response to the indication of handover, and the first access node sending the application service platform context data for the user equipment to the second access node via said handover signaling.

2. The method of claim 1, wherein said handover signaling comprises a handover preparation message sent from the first access node to the second access node.

3. A method for providing an application service to a user equipment operating in a telecommunications network, the method comprising:

serving a user equipment from a first access node in the telecommunications network, including providing an application service to the user equipment via a first application service platform integrated or co-located with the first access node and configured to provide the application service to user equipments served by the first access node;

generating application service platform context data for the user equipment at the first application service platform in conjunction with providing the application service, the application service platform context data comprising information regarding use of the application service by the user equipment;

handing the user equipment over from the first access node to a second access node in the telecommunications network, wherein a second application service platform is integrated or co-located with the second access node and is configured to provide the application service to user equipments served by the second access node; and in conjunction with handing the user equipment over to the second access node, transferring the application service platform context data for the user equipment from the first application service platform to the second application service platform for use in providing the application service to the user equipment after handover, based on the first access node obtaining the application service platform context data for the user equipment from the first application service platform and sending, via handover signaling, the application service platform context for the user equipment to the second access node, for transfer to the second application service platform;

wherein the method further comprises the first access node including the application service platform context data for the user equipment in one or more Radio Access Network (RAN) transparent containers and sending the one or more RAN transparent containers to the second access node in said handover signaling, each RAN transparent container comprising an Information Element (IE) that passes transparently, without modification, from the first access node to the second access node, for transfer by the second access node to the second application service platform.

4. A method for providing an application service to a user equipment operating in a telecommunications network, the method comprising:

serving a user equipment from a first access node in the telecommunications network, including providing an application service to the user equipment via a first application service platform integrated or co-located with the first access node and configured to provide the application service to user equipments served by the first access node;

generating application service platform context data for the user equipment at the first application service platform in conjunction with providing the application service, the application service platform context data comprising information regarding use of the application service by the user equipment;

handing the user equipment over from the first access node to a second access node in the telecommunications network, wherein a second application service platform is integrated or co-located with the second access node and is configured to provide the application service to user equipments served by the second access node; and in conjunction with handing the user equipment over to the second access node, transferring the application service platform context data for the user equipment from the first application service platform to the second application service platform for use in providing the application service to the user equipment after handover, based on the first access node obtaining the application service platform context data for the user equipment from the first application service platform and sending, via handover signaling, the application service platform context for the user equipment to the second access node, for transfer to the second application service platform;

wherein the application service platform context data for the user equipment comprises at least one of: active session information for the user equipment regarding the application service, transaction state information for the user equipment regarding the application service, and packet statistics for the user equipment regarding the application service.

5. The method of claim 4, wherein the application service platform context data for the user equipment further comprises one or more of: a user equipment identifier, subscription information associated with the user equipment, a temporary radio network identifier assigned to the user equipment, and signal strength or quality measurements for the user equipment with respect to the first access node.

6. An apparatus configured for operation in a telecommunications network, the apparatus comprising:

a first access node configured to serve a user equipment, including providing the user equipment with access to the telecommunications network;

a first application service platform integrated or co-located with the first access node and configured to provide an application service to the user equipment;

wherein the first application service platform comprises processing circuitry that is configured to generate application service platform context data for the user equipment in conjunction with providing the application service to the user equipment; and wherein the first access node comprises processing circuitry that is configured to:

hand the user equipment over from the first access node to a second access node in the telecommunications network, wherein a second application service platform is integrated or co-located with the second access node and is configured to provide the application service to user equipments served by the second access node; and in conjunction with handing the user equipment over to the second access node, transfer the application service platform context data for the user equipment from the first application service platform to the second application service platform for use in providing the application service to the user equipment after handover, based on the first access node obtaining the application service platform context data for the user equipment from the first application service platform and sending, via handover signaling, the application service platform context for the user equipment to the second access node, for transfer to the second application service platform;

wherein the processing circuitry of the first access node is configured to transfer the application service platform context data for the user equipment by providing an indication of the handover to the first application service platform, receiving the application service platform context data for the user equipment from the first application service platform in response to the indication of handover, and sending the application service platform context data for the user equipment to the second access node via said handover signaling.

7. An apparatus configured for operation in a telecommunications network, the apparatus comprising:
a first access node configured to serve a user equipment, including providing the user equipment with access to the telecommunications network;
a first application service platform integrated or co-located with the first access node and configured to provide an application service to the user equipment;
wherein the first application service platform comprises processing circuitry that is configured to generate application service platform context data for the user equipment in conjunction with providing the application service to the user equipment; and
wherein the first access node comprises processing circuitry that is configured to:
hand the user equipment over from the first access node to a second access node in the telecommunications network, wherein a second application service platform is integrated or co-located with the second access node and is configured to provide the application service to user equipments served by the second access node; and
in conjunction with handing the user equipment over to the second access node, transfer the application service platform context data for the user equipment from the first application service platform to the second application service platform for use in providing the application service to the user equipment after handover, based on the first access node obtaining the application service platform context data for the user equipment from the first application service platform and send, via handover signaling, the application service platform context for the user equipment to the second access node, for transfer to the second application service platform; and
wherein the processing circuitry of the first access node is further configured to include the application service platform context data for the user equipment in one or more Radio Access Network (RAN) transparent containers and send the one or more RAN transparent containers to the second access node in said handover signaling, each RAN transparent container comprising an Information Element (IE) that passes transparently, without modification, from the first access node to the second access node, for transfer by the second access node to the second application service platform.

8. An apparatus configured for operation in a telecommunications network, the apparatus comprising:
a first access node configured to serve a user equipment, including providing the user equipment with access to the telecommunications network;
a first application service platform integrated or co-located with the first access node and configured to provide an application service to the user equipment;
wherein the first application service platform comprises processing circuitry that is configured to generate application service platform context data for the user equipment in conjunction with providing the application service to the user equipment; and
wherein the first access node comprises processing circuitry that is configured to:
hand the user equipment over from the first access node to a second access node in the telecommunications network, wherein a second application service platform is integrated or co-located with the second access node and is configured to provide the application service to user equipments served by the second access node; and
in conjunction with handing the user equipment over to the second access node, transfer the application service platform context data for the user equipment from the first application service platform to the second application service platform for use in providing the application service to the user equipment after handover, based on the first access node obtaining the application service platform context data for the user equipment from the first application service platform and send, via handover signaling, the application service platform context for the user equipment to the second access node, for transfer to the second application service platform;
wherein the application service platform context data for the user equipment comprises at least one of: active session information for the user equipment regarding the application service, transaction state information for the user equipment regarding the application service, and packet statistics for the user equipment regarding the application service.

* * * * *